(12) United States Patent
Hirschfeld

(10) Patent No.: US 8,134,070 B2
(45) Date of Patent: Mar. 13, 2012

(54) BUSBAR PACK

(75) Inventor: Thomas Hirschfeld, Burgthann (DE)

(73) Assignee: Siemens Aktiengesellschaft, München (DE)

( * ) Notice: Subject to any disclaimer, the term of this patent is extended or adjusted under 35 U.S.C. 154(b) by 454 days.

(21) Appl. No.: 12/518,567

(22) PCT Filed: Oct. 19, 2007

(86) PCT No.: PCT/EP2007/061195
§ 371 (c)(1),
(2), (4) Date: Jun. 10, 2009

(87) PCT Pub. No.: WO2008/071493
PCT Pub. Date: Jun. 19, 2008

(65) Prior Publication Data
US 2010/0025105 A1   Feb. 4, 2010

(30) Foreign Application Priority Data

Dec. 11, 2006 (DE) .................. 10 2006 058 327

(51) Int. Cl.
*H05K 1/02* (2006.01)
*H02B 1/20* (2006.01)

(52) U.S. Cl. .................. 174/72 B; 174/71 B; 174/88 B; 174/99 B; 174/133 B; 361/611; 361/637; 361/648; 439/212

(58) Field of Classification Search ............... 174/72 B, 174/71 B, 88 B, 70 B, 99 B, 129 B, 133 B, 174/149 B; 439/212, 213, 214; 361/675, 361/715, 306.1, 600, 601, 611, 637, 638, 361/639, 648, 649

See application file for complete search history.

(56) References Cited

U.S. PATENT DOCUMENTS

| 3,555,293 | A | * | 1/1971 | Shannon et al. | 174/68.3 |
| 3,609,215 | A | * | 9/1971 | Giger et al. | 174/88 B |
| 3,995,103 | A | | 11/1976 | Gehrs | |
| 4,112,249 | A | * | 9/1978 | Carlson | 174/68.2 |
| 4,118,639 | A | * | 10/1978 | Rosey et al. | 174/99 B |
| 4,366,528 | A | * | 12/1982 | Cole | 174/133 B |
| 5,166,861 | A | | 11/1992 | Krom | |
| 6,381,122 | B2 | * | 4/2002 | Wagener | 174/71 B |
| 6,489,567 | B2 | * | 12/2002 | Zachrai | 174/70 B |
| 6,934,147 | B2 | * | 8/2005 | Miller et al. | 174/72 B |
| 7,511,946 | B2 | * | 3/2009 | Malkowski et al. | 361/648 |
| 7,830,648 | B2 | * | 11/2010 | Strong et al. | 174/71 B |
| 7,924,550 | B2 | * | 4/2011 | Hirschfeld | 361/611 |

FOREIGN PATENT DOCUMENTS

| DE | 34 38 499 A1 | 4/1986 |
| DE | 88 13 533 U1 | 12/1988 |
| DE | 93 03 886 U1 | 6/1993 |
| DE | 10 2004 018 469 B3 | 10/2005 |

* cited by examiner

*Primary Examiner* — Angel R Estrada
(74) *Attorney, Agent, or Firm* — Henry M. Feiereisen; Ursula B. Day

(57) ABSTRACT

The invention relates to a busbar pack comprising n busbars (2) and at least n−1 insulating bars (4) the surfaces of which project beyond the busbars (2), one insulating bar (4) being interposed between two busbars (2), said stack of bars (2, 4) being immobilized in their position relative each other by devices. The invention is characterized in that at least one inner busbar (2) is provided with a reticular bar (6) on both sides thereof and has perforations (14) that are arranged to match crossbars (12) of corresponding reticular bars (6). The invention allows production of a busbar pack at least the inner busbar (2) of which is convection-cooled, said busbar cooling system being producible at low costs.

10 Claims, 2 Drawing Sheets

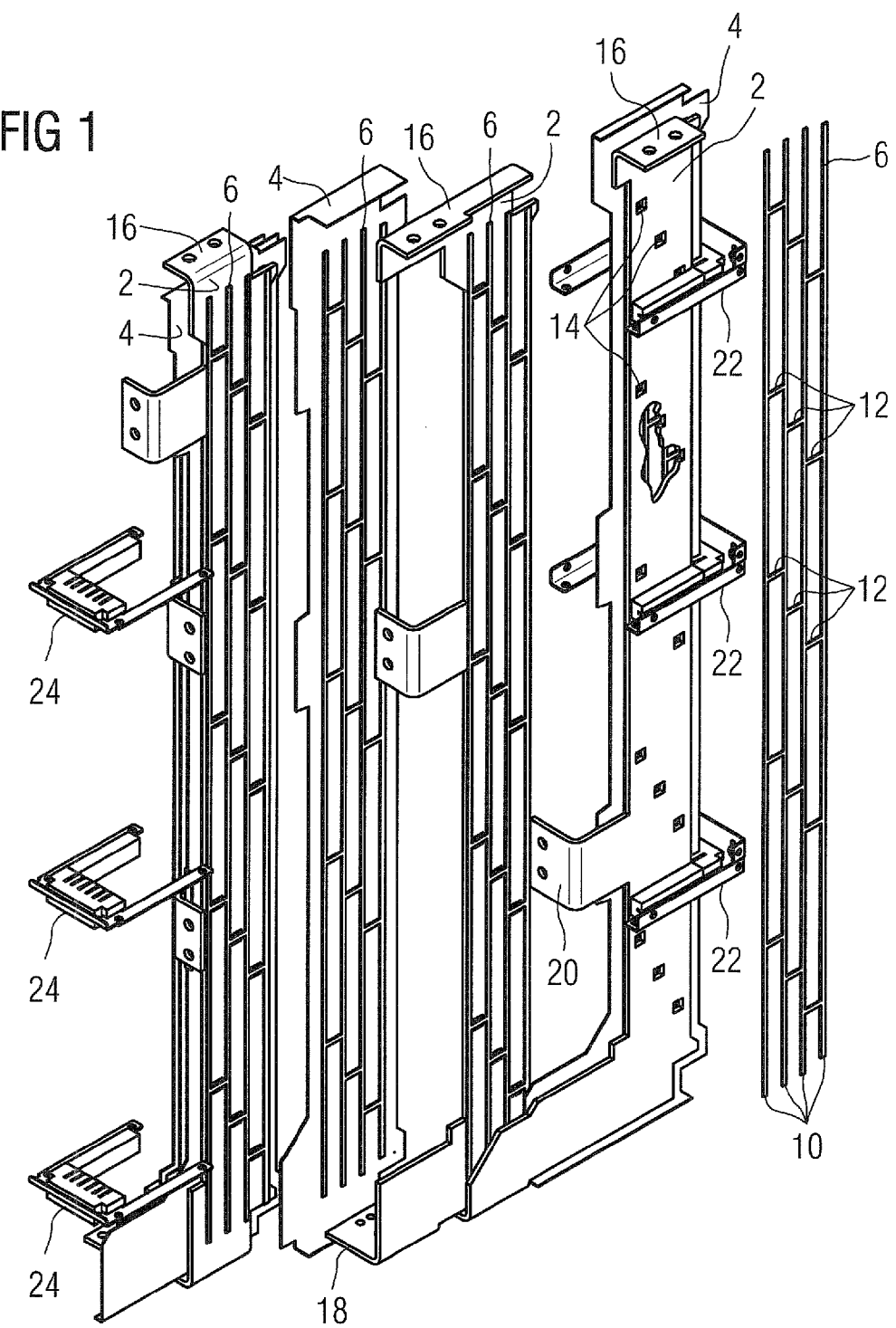

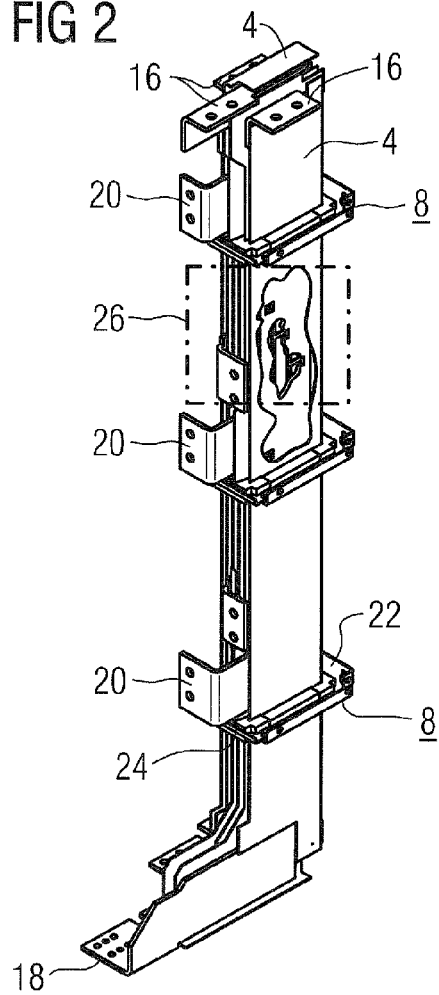
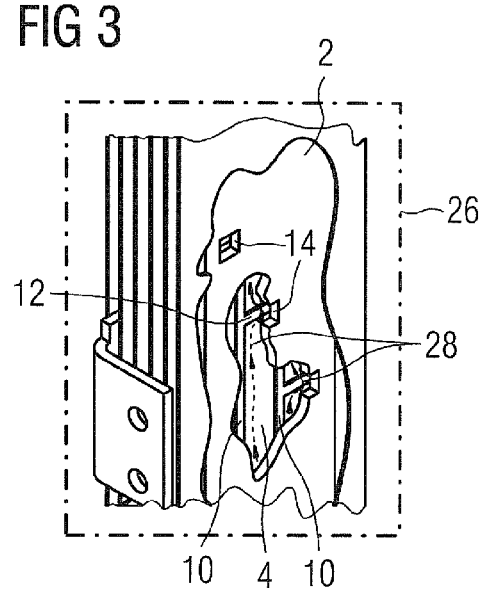

BUSBAR PACK

CROSS-REFERENCES TO RELATED APPLICATIONS

This application is the U.S. National Stage of International Application No. PCT/EP2007/061195, filed Oct. 19, 2007, which designated the United States and has been published as International Publication No. WO 2008/071493 and which claims the priority of German Patent Application, Serial No. 10 2006 058 327.2, filed Dec. 11, 2006, pursuant to 35 U.S.C. 119(a)-(d).

BACKGROUND OF THE INVENTION

The invention relates to a busbar pack.

Busbars are accommodated in commercially available converters. Up to three busbars, in particular busbars with thin surfaces, are physically isolated from one another in these busbar packs by means of isolating bars, for example plastic bars. These seven bars are combined to form a pack by means of apparatuses, for example screws. This busbar pack is advantageously accommodated and connected at an airy or ventilated installation location in the converter. If other components of the converter are fitted around this busbar pack because of a shortage of space in the interior of the converter, then this busbar pack cannot be cooled, or cannot be adequately cooled, by air convection. The parts of the busbar pack, for example the isolating bars and their screws, are therefore thermally highly loaded or overloaded, as a result of which the busbar pack could fail as a result of excessive thermal loading. This disadvantage could be overcome by the use of high-temperature-resistant parts composed of insulating material, but these cannot be used for cost reasons.

SUMMARY OF THE INVENTION

The invention is now based on the object of developing the known busbar pack such that the busbars are adequately ventilated.

According to the invention, this object is achieved by a busbar pack having n busbars and at least n−1 isolating bars which overhang the area of these busbars, with one isolating bar in each case being arranged between two busbars, and with this stack of bars being fixed in their position with respect to one another by means of apparatuses, wherein at least one inner busbar of the busbar pack is provided with a bar in the form of a mesh on both sides, and this busbar is provided with apertures which are arranged to correspond to the transverse webs of the corresponding bar which is in the form of a mesh.

Since at least one inner busbar in the busbar pack has at least one associated bar which is in the form of a mesh on both sides, and this busbar is in each case provided with a number of apertures, with these apertures being arranged such that they correspond to transverse webs of corresponding bars which are in the form of meshes, cooling air can flow along both sides of each busbar by means of convection.

How well at least the inner busbar in the busbar pack is cooled depends on the design of the bar which is in the form of a mesh and therefore also on the design and positioning of the apertures in this busbar.

According to another feature of the invention, the transverse webs of each bar which is in the form of a mesh are arranged aligned with one another. The corresponding apertures in a corresponding busbar are therefore likewise arranged alongside one another in a row over the width of the busbar. If the bar which is in the form of a mesh has a plurality of longitudinal webs over the width of a busbar, which are linked to one another by means of the transverse webs, then the apertures have square cross sections.

In order to allow at least the inner busbar of the busbar pack to be cooled, a plurality of groups of aligned apertures are incorporated in this busbar over its entire length.

If the transverse webs in one group of transverse webs were to be arranged in a stepped form with respect to one another, then the apertures could be made larger. In consequence, the apertures each have rectangular cross sections. This stepping of the transverse webs increases the air flow rate through the busbar pack without excessively severely adversely affecting the cross section of at least the inner busbar in the busbar pack.

In order to simplify the production of the numerous apertures of at least one inner busbar of the busbar pack, these apertures are circular. These apertures are therefore created by drilling and no longer by stamping.

Independently of the function of the two bars which are in the form of meshes of at least one inner busbar in the busbar pack, these bars which are in the form of meshes may be composed of electrically insulating material or electrically conductive material. If they are composed of electrically conductive material, then a portion of the current of this inner busbar can also flow via the bar which is in the form of a mesh. This reduces the thermal load on this inner busbar.

In order to prevent the bars in this busbar pack according to the invention from being additionally weakened by holes for apparatuses for connection of the bars to form a pack, two U-shaped fastening brackets are in each case provided as an apparatus. These U-shaped fastening brackets of the two-part apparatus are used not only to hold the bars together to form a stack, but the isolating bars which overhang the area of these busbars are fixed to one another by them. The number of these two-part apparatuses that are used depends on the length of the busbar pack.

BRIEF DESCRIPTION OF THE DRAWING

The invention will be explained further by reference to the drawing which schematically illustrates one embodiment of a busbar pack according to the invention, and in which:

FIG. 1 shows an exploded illustration of one advantageous busbar pack according to the invention, FIG. 2 shows a busbar pack according to the invention and as shown in FIG. 1 in the assembled state and FIG. 3 shows the marked detail from FIG. 2, enlarged.

DETAILED DESCRIPTION OF PREFERRED EMBODIMENTS

In FIG. 1, 2 denotes a busbar, 4 an isolating bar, 6 a bar which is in the form of a mesh and 8 a two-part apparatus. As can be seen from this illustration, each bar 6 which is in the form of a mesh is arranged on a flat face of each busbar 2. This means that each busbar 2 is provided with bars 6 which are in the form of meshes on both sides. In order to keep the complexity for cooling the busbar pack as low as possible, it is sufficient for only one inner busbar 2 in the busbar pack to be provided with bars 6 which are in the form of meshes, on both sides. This means that, in the case of a three-phase busbar pack, only the inner busbar 2 of this busbar pack is provided with the additional bars 6 which are in the form of meshes. The illustrated bars 6 which are in the form of meshes in this illustration have four longitudinal webs 10 and fifteen transverse webs 12. These transverse webs 12 separate the longitudinal webs 10 from one another. With four longitudinal webs 10, three transverse webs 12 in each case form a group. In this illustration, five groups of transverse webs 12 are shown over the length of the busbar 2. This interconnection of groups of transverse webs 12 and longitudinal webs 10 as shown in the illustration forms a bar which is in the form of a mesh.

As can likewise be seen from the illustration in FIG. 1, the busbars 2 each have a multiplicity of apertures 14. These apertures 14 are arranged to correspond to the transverse webs 12 of the two bars 6 which are in the form of meshes and are associated here. In order to allow the air to rise along the busbar 2 between two longitudinal webs 14, the apertures 14 in the busbar 2 must be sufficiently large that the rising air can flow around the transverse webs 12 through the apertures 14. Two longitudinal webs 10 which are arranged alongside one another of a bar 6 which is in the form of a mesh, and in conjunction with a corresponding isolating bar 4, thus in each case form a cooling channel in which the cooling air can rise, in conjunction with the apertures 14 in the associated busbar 2.

In the illustration shown in FIG. 1, the longitudinal and transverse webs 10 and 12, which are arranged in the form of a mesh, of a bar 6 which is in the form of a mesh form three cooling channels which run alongside one another. A transverse web 12 is bridged, for coolant purposes, by means of the corresponding aperture 14 at each point of the transverse web 12 at which the cooling channel is interrupted. The isolating bar 4 which, in one known busbar pack, rests directly on a flat face of a busbar 2, is located in the busbar pack according to the invention on the bar 6 which rests on the busbar 2 and is in the form of a mesh. The cooling channels formed by the bar 6 which is in the form of a mesh are therefore covered. Cooling air can therefore flow by means of convection only along the flat face of a busbar 2.

As can also be seen from the illustration in FIG. 1, each busbar 2 has an upper and a lower angled area 16 and 18 at the end. In addition, each busbar 2 likewise has an angled area 20 on a narrow face. The areas 16 and 18 in each case form a connection on the power supply side, while in contrast the area 20 forms a connection on the load side.

A plurality of two-part apparatuses 8 can likewise be seen in this exploded illustration. Each two-part apparatus 8 has two U-shaped fastening brackets 22 and 24. The connecting webs of the U-shaped fastening brackets 22, 24 of each apparatus 8 have grooves. These grooves are designed such that those areas of the isolating bar 4 which overhang a busbar 2 can be plugged. This area of an isolating bar 4 which overhangs a busbar 2 is designed to comply with the requirements for air gaps and creepage distances. The isolating bars 4 are fixed in their position along the busbar pack by means of the grooves in the connecting webs of the U-shaped fastening brackets 22, 24 of each two-part apparatus 8. Furthermore, one limb of each U-shaped fastening bracket 22, 24 has a groove which runs along the limb or a lug which runs along the limb. This groove and lug are designed such that this lug can be clamped by the groove. When the bars 2, 4, 6 in the busbar pack are being assembled to form a bar pack, the two U-shaped fastening brackets 22, 24 of every two-part apparatus 8 are each pushed onto one narrow face of the bar pack. In the process, these limbs on the two U-shaped fastening brackets 22, 24 of a two-part apparatus 8 engage in one another such that the lug of one limb of one U-shaped fastening bracket 22 engages in the groove in one limb of the other U-shaped fastening bracket 24 of a two-part apparatus 8. The busbar pack is therefore clamped without any play. When these two U-shaped fastening brackets 22 and 24 of a two-part apparatus 8 are in the final position, they latch, or are screwed to one another.

FIG. 2 illustrates an assembled busbar pack according to the invention. This illustration shows the closed apparatuses 8, which each comprise two U-shaped fastening brackets 22 and 24 which are pushed one inside the other. An area which is illustrated enlarged in FIG. 3 is also marked as 26 in this FIG.

The flow paths 28 of cooling air in two cooling channels which are arranged alongside one another are illustrated in the enlarged illustration of the area 26 of the converter pack shown in FIG. 2. This illustration shows a part of the busbar 2 with three apertures 14, which are arranged offset with respect to one another in a stepped form, two longitudinal webs 10 and two transverse webs 12 of a bar 6 which is in the form of a mesh, and an isolating bar 4. This illustration shows the coolant bridging of the transverse webs 12 by the cooling air.

The addition of in each case two bars 6, which are in the form of meshes, to a busbar 2 and the introduction of apertures 14 in this busbar 2 at points which correspond to the transverse webs 12 of the two bars 6 which are in the form of meshes and are fitted on both sides results in the busbar 2 being adequately cooled by convection within a busbar pack. This busbar pack according to the invention is not significantly broader than a busbar pack as is normally used. Furthermore, this busbar cooling can be produced at very low cost.

What is claimed is:

1. A busbar pack comprising:
   at least three busbars having apertures;
   at least two isolating bars, with each isolating bar arranged between two corresponding busbars and projecting over an area of the corresponding busbars;
   a plurality of mesh-like bars having transverse webs arranged to overlap with the apertures, with each mesh-like bar covering a respective side of at least one inner busbar; and
   fixtures securing the busbars and the isolating bars in a fixed position relative to one another.

2. The busbar pack of claim 1, wherein the mesh-like bars cover both sides of each busbar.

3. The busbar pack of claim 1, wherein the transverse webs of each mesh-like bar are aligned with respect to one another across a width of a busbar.

4. The busbar pack of claim 1, wherein the transverse webs of each mesh-like bar are arranged in steps with respect to one another across a width of a busbar.

5. The busbar pack of claim 1, wherein the apertures in each busbar are rectangular.

6. The busbar pack of claim 1, wherein the apertures in each busbar are square.

7. The busbar pack of claim 1, wherein the apertures in each busbar are circular.

8. The busbar pack of claim 1, wherein the mesh-like bars are composed of an electrically insulating material.

9. The busbar pack of claim 1, wherein the mesh-like bars are composed of an electrically conductive material.

10. The busbar pack of claim 1, wherein the fixtures securing the busbars and the isolating bars comprise two U-shaped brackets.

* * * * *